(12) United States Patent
Iwata et al.

(10) Patent No.: US 11,329,343 B2
(45) Date of Patent: May 10, 2022

(54) BATTERY DEVICE FOR VEHICLE

(71) Applicant: MAZDA MOTOR CORPORATION, Hiroshima (JP)

(72) Inventors: Kazuo Iwata, Hiroshima (JP); Junya Kono, Hiroshima (JP); Yoshihiko Yayoshi, Hiroshima (JP); Tomohiro Masui, Hiroshima (JP); Tomoyoshi Matsushima, Hiroshima (JP); Kunihiro Jo, Hiroshima (JP); Daisuke Watanabe, Hiroshima (JP); Yoshinobu Katayama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 71 days.

(21) Appl. No.: 16/820,369

(22) Filed: Mar. 16, 2020

(65) Prior Publication Data
US 2020/0343502 A1    Oct. 29, 2020

(30) Foreign Application Priority Data

Apr. 24, 2019 (JP) .............................. JP2019-082570

(51) Int. Cl.
*B60L 50/64* (2019.01)
*H01M 50/20* (2021.01)
*B60L 50/60* (2019.01)
*H01M 10/44* (2006.01)

(52) U.S. Cl.
CPC ............. *H01M 50/20* (2021.01); *B60L 50/64* (2019.02); *B60L 50/66* (2019.02); *H01M 10/44* (2013.01); *H01M 2220/20* (2013.01)

(58) Field of Classification Search
CPC .. B60K 1/04; B62B 3/005; B62B 3/02; B62B 5/00
See application file for complete search history.

(56) References Cited

U.S. PATENT DOCUMENTS

| | | | |
|---|---|---|---|
| 7,714,460 B2* | 5/2010 | Yabumoto | B60R 25/02153 307/10.2 |
| 9,260,065 B2* | 2/2016 | Tanigaki | B60R 16/0215 |
| 2009/0120703 A1* | 5/2009 | Nagata | B60K 1/04 180/68.5 |
| 2013/0020139 A1* | 1/2013 | Kim | B60K 1/04 180/68.5 |
| 2016/0222631 A1* | 8/2016 | Koh | B60L 1/003 |

FOREIGN PATENT DOCUMENTS

JP    5776852 B2    9/2015

* cited by examiner

*Primary Examiner* — Jonathan Ng
*Assistant Examiner* — James J Triggs
(74) *Attorney, Agent, or Firm* — Studebaker & Brackett PC

(57) ABSTRACT

A battery device for a vehicle, which can be miniaturized while including ancillary instruments such as a relay device. The battery device is mounted in a lower portion of a vehicle, and including a battery case; a plurality of battery modules accommodated in the battery case and arranged such that at least some of the battery modules are stacked in a plurality of levels; and a first relay device that switches connection and disconnection between external electric devices and the battery modules. The first relay device is disposed on a side in a vehicle width direction of a portion where the battery modules are stacked in a plurality of levels.

16 Claims, 8 Drawing Sheets

BATTERY DEVICE FOR VEHICLE

BACKGROUND

Technical Field

The present disclosure relates to a battery device for a vehicle, and more particularly relates to a battery device for a vehicle, which is mounted in a lower portion of a vehicle.

Background Art

Japanese Patent No. 5776852 describes a high-voltage harness connection structure for an electrically driven vehicle. In an electrically driven vehicle described in Japanese Patent No. 5776852, a battery pack is disposed under a passenger seat, and a high-voltage harness extends from a front end portion of the battery pack and is connected to an inverter, etc. disposed in front of a driver seat. Further, a junction box is incorporated in the front end portion of the battery pack to switch an electrical connection between the battery pack and an externally connected device.

That is, the junction box incorporated in the battery pack is configured to supply, shut off, and distribute high voltage by a relay circuit. The junction box and a power module of the vehicle are connected through a connector terminal and a harness.

Thus, there are a number of ancillary instruments such as the junction box (relay device) needed to be included in a battery device, and providing such instruments causes a problem of an increase in the size of the battery device.

Therefore, the present disclosure provides a battery device for a vehicle, which can be miniaturized while including ancillary instruments such as a relay device.

SUMMARY

Accordingly, the present disclosure provides a battery device for a vehicle. The battery device is mounted in a lower portion of a vehicle and includes a battery case; a plurality of battery modules accommodated in the battery case and arranged such that at least some of the battery modules are stacked in a plurality of levels in a vehicle up-down direction; and a first relay device that switches connection and disconnection between an external electric device and the battery modules. The first relay device is disposed on a side in a vehicle width direction of a portion where the battery modules are stacked in a plurality of levels.

According to the present disclosure thus configured, since the first relay device is disposed on a side in the vehicle width direction of the portion where the battery modules are stacked in a plurality of levels, it is possible to miniaturize the battery device for a vehicle while including the relay device.

In the present disclosure, preferably, the battery device for a vehicle further includes a second relay device for connecting the battery modules and an electric motor mounted on the vehicle, wherein the second relay device is disposed in a front end portion of the battery case in a front-rear direction of the vehicle.

According to the present disclosure thus configured, the battery device for a vehicle includes the second relay device separately from the first relay device, and the second relay device is disposed in the front end portion of the battery case in the front-rear direction of the vehicle. Therefore, it is possible to miniaturize individual relay devices, and it is possible to effectively utilize small empty space in the battery case.

In the present disclosure, preferably, the vehicle is provided with a charging device for charging the battery modules, the charging device is disposed on a rear side of the vehicle relative to the battery device for a vehicle, and the first relay device switches connection and disconnection between the charging device and the battery modules.

According to the present disclosure thus configured, since connection and disconnection between the battery modules and the charging device disposed on the rear side of the battery device for a vehicle are switched by the first relay device, a harness that connects the battery modules and the charging device can be shortened, and transmission loss of electric power can be reduced.

In the present disclosure, preferably, the battery device for a vehicle further includes a battery controller for controlling the first relay device, and the battery controller is disposed on an opposite side to the first relay device with respect to the battery modules in a vehicle width direction.

According to the present disclosure thus configured, since the battery controller is disposed on the opposite side to the first relay device with respect to the battery modules in the vehicle width direction, the battery controller can also be compactly accommodated in the battery case.

In the present disclosure, preferably, in a side view of the vehicle, the first relay device is disposed to overlap with the battery modules stacked in a plurality of levels. According to the present disclosure thus configured, in the side view of the vehicle, since the first relay device is disposed to overlap with the battery modules stacked in a plurality of levels, it is possible to reduce the projected area of the battery device for a vehicle in the side view.

In the present disclosure, preferably, in the portion where the battery modules are stacked in a plurality of levels, the battery modules on an upper side are disposed so as to be shifted toward the rear side of the vehicle in the vehicle front-rear direction relative to the battery modules on a lower side, and a wire harness to be connected to the first relay device is disposed in a space produced by shifting the battery modules on the upper side toward the rear side.

According to the present disclosure thus configured, since the wire harness is disposed in the space produced by shifting the battery modules on the upper side toward the rear side, even if the vehicle collides, the wire harness is less likely damaged, and it is possible to protect the wire harness.

According to the present disclosure, it is possible to miniaturize a battery device for a vehicle while including ancillary instruments such as a relay device.

DETAILED DESCRIPTION

Figure 1:
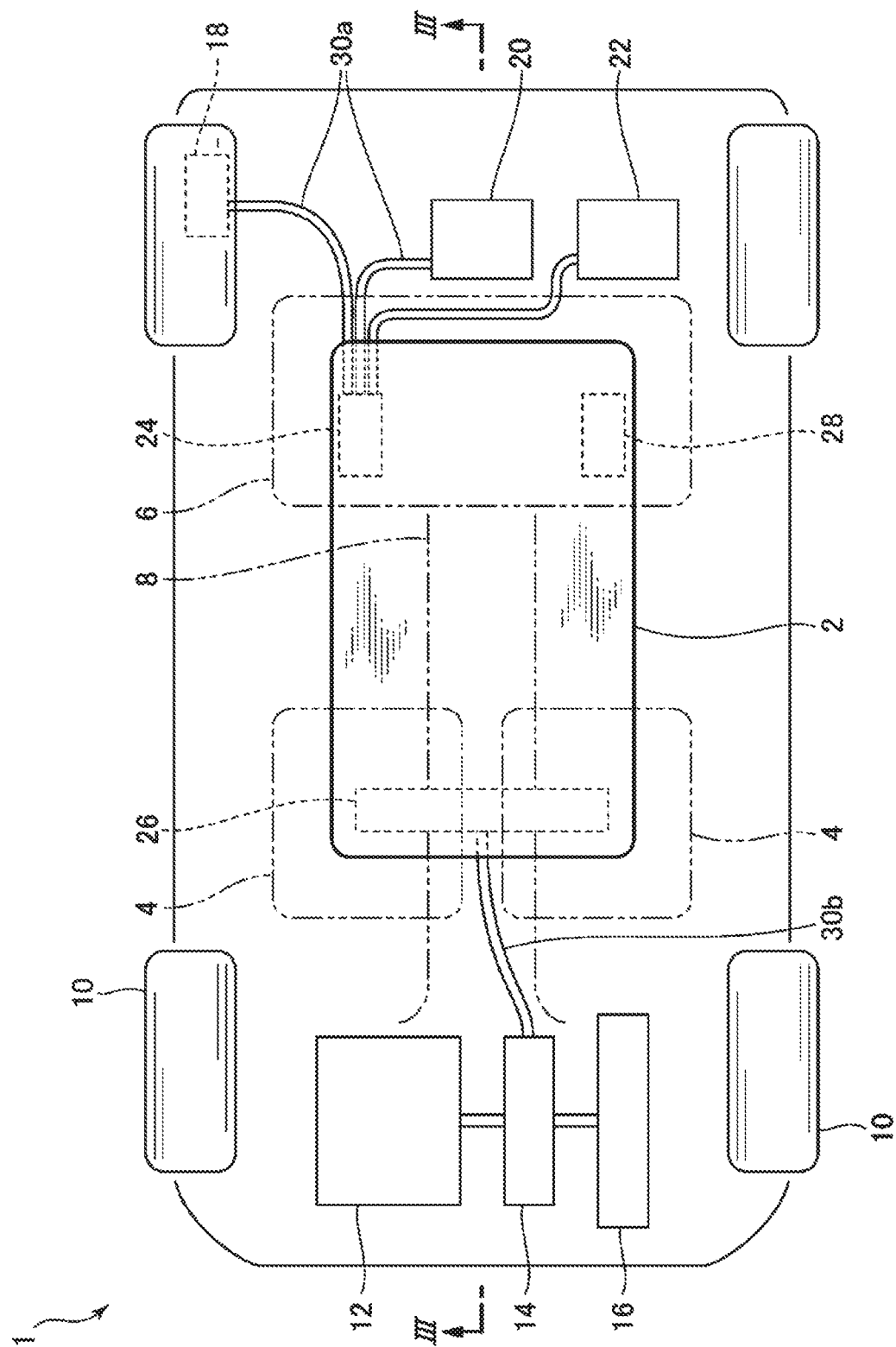
FIG. 1 is a layout view, seen from above, of a vehicle incorporating a battery device for a vehicle according to an embodiment of the present disclosure.
Figure 2:
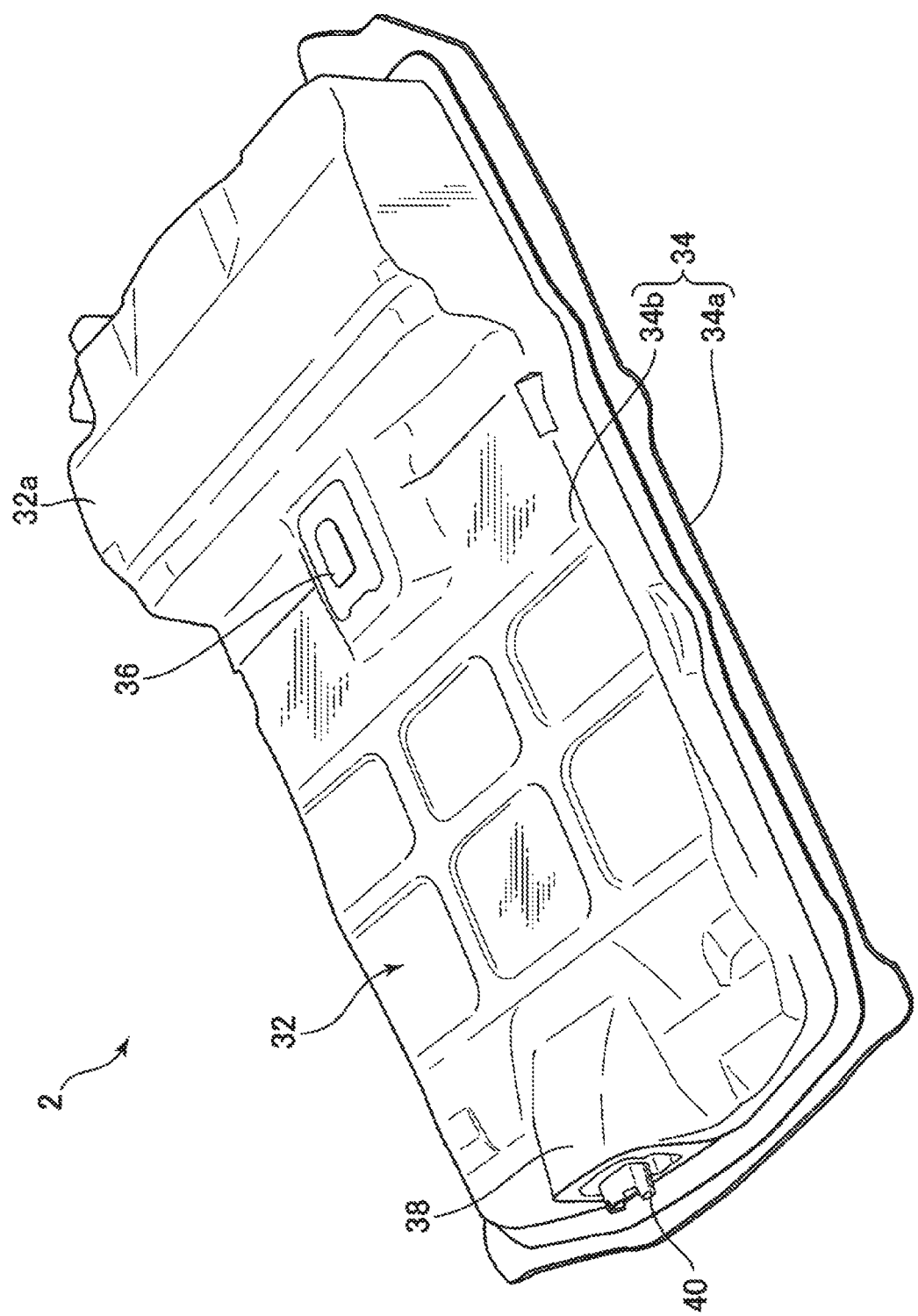
FIG. 2 is a perspective view of the battery device for a vehicle according to the embodiment of the present disclosure.
Figure 3:
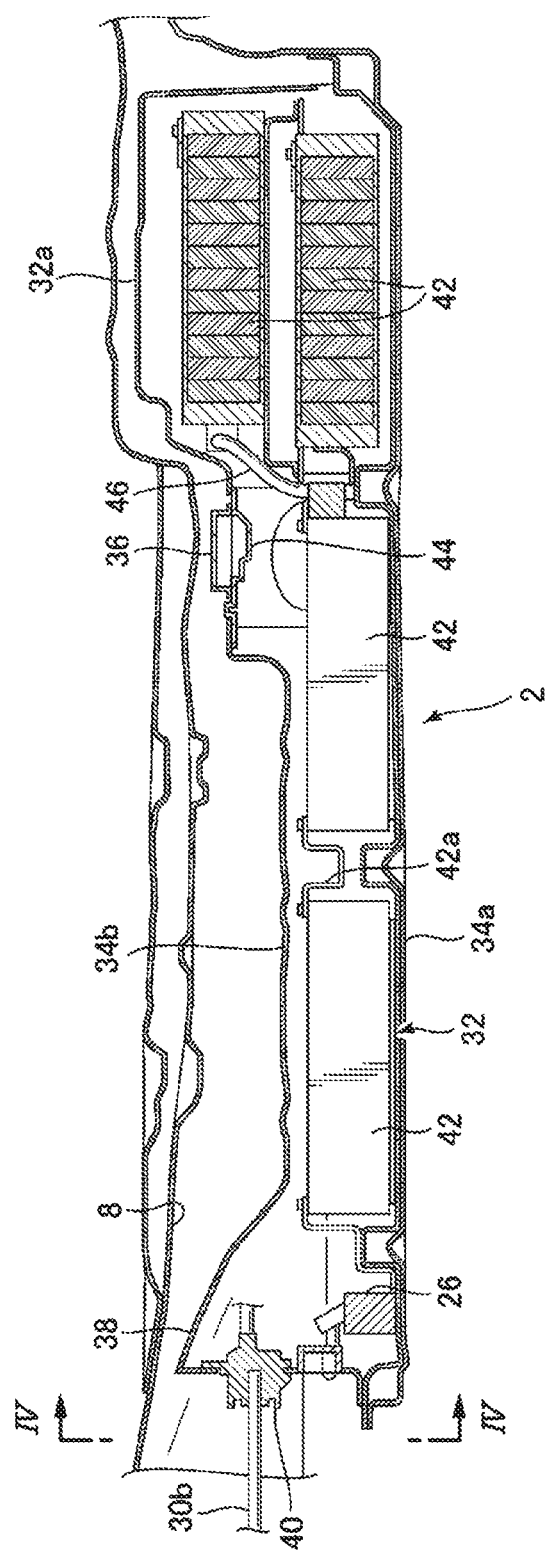
FIG. 3 is a sectional view, along the III-III line in FIG. 1, of the vehicle incorporating the battery device for a vehicle according to the embodiment of the present disclosure.
Figure 4:
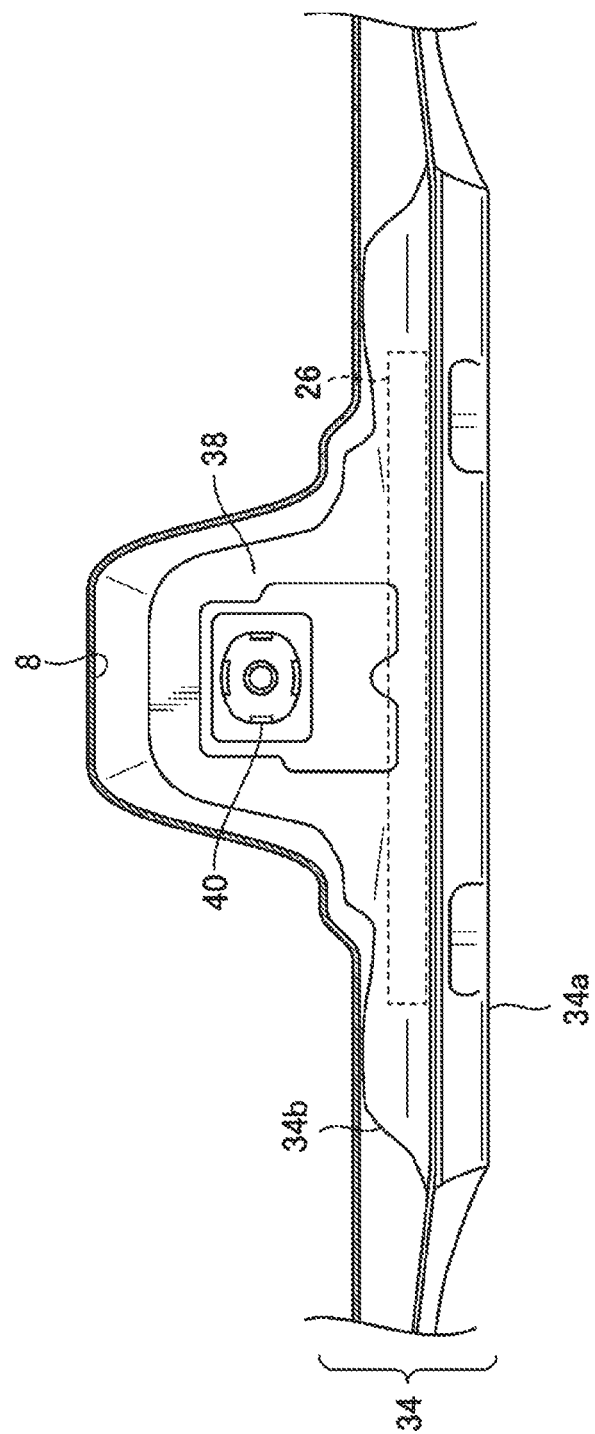
FIG. 4 is a sectional view, along the IV-IV line in FIG. 3, of the vehicle incorporating the battery device for a vehicle according to the embodiment of the present disclosure.

Next, a battery device for a vehicle of an embodiment of the present disclosure will be described with reference to the attached drawings. FIG. 1 is a layout view, seen from above, of a vehicle incorporating the battery device for a vehicle according to the embodiment of the present disclosure. FIG. 2 is a perspective view of the battery device for a vehicle according to the embodiment of the present disclosure. FIG. 3 is a sectional view, along the line III-III in FIG. 1, of the vehicle incorporating the battery device for a vehicle according to the embodiment of the present disclosure. FIG. 4 is a sectional view, along the IV-IV line in FIG. 3, of the vehicle incorporating the battery device for a vehicle according to the embodiment of the present disclosure.

As shown in FIG. 1, the battery device for a vehicle according to the embodiment of the present disclosure is mounted in a lower portion of a vehicle 1, and is connected to various electric devices mounted on the vehicle 1. Specifically, a battery device 2 for a vehicle is configured in a roughly rectangular shape in a top view, and is disposed at the center in the lower portion of the vehicle 1. That is, the battery device 2 for a vehicle extends from the lower side of front seats 4 of the vehicle 1 to the vicinity of the lower side of a rear seat 6, and is disposed at the center in a vehicle width direction. A tunnel portion 8 is provided at the center in the width direction of the lower portion of the vehicle 1 so as to extend in a front-rear direction, and the battery device 2 for a vehicle is disposed under the tunnel portion 8. That is, the tunnel portion 8 is formed to extend from the front portion of the vehicle 1 through a space between the front seats 4 to the vicinity of the rear seat 6.

Disposed in the front portion of the vehicle 1 are a drive motor 12 that is an electric motor for driving front wheels 10 of the vehicle 1, an inverter 14 for converting DC power to alternating current, a DC-to-DC converter 16 for converting DC voltage, etc. Moreover, a side surface in a rear portion of the vehicle 1 is provided with a charging port 18 to which a charging plug (not shown) of a charging station is to be connected for charging the battery device 2 for a vehicle. Furthermore, a charger 20 that is an electric device for charging the battery device 2 for a vehicle, and a power feeder 22 are disposed in the rear portion of the vehicle 1. The charging port 18, the charger 20 and the power feeder 22 function as a charging device for charging the battery device 2 for a vehicle.

The battery device 2 for a vehicle includes a first relay device 24, a second relay device 26 and a battery controller 28 which are configured to switch connection and disconnection between the battery device 2 for a vehicle and an electric device mounted on the vehicle 1 as described later. In the present embodiment, the first relay device 24 is incorporated in a side surface in a rear portion of the battery device 2 for a vehicle, and is connected to the charging port 18, the charger 20 and the power feeder 22 disposed in the rear portion of the vehicle 1. The second relay device 26 is incorporated in the center of a front end portion of the battery device 2 for a vehicle, and is connected to the drive motor 12, the inverter 14 and the DC-to-DC converter 16 disposed in the front portion of the vehicle 1. The battery controller 28 is incorporated in an opposite side surface to the first relay device 24 in the rear portion of the battery device 2 for a vehicle, and is configured to control the first relay device 24.

Further, the first relay device 24 is connected to the charging port 18, the charger 20 and the power feeder 22 with a wire harness 30a, and the second relay device 26 is connected to the drive motor 12, the inverter 14 and the DC-to-DC converter 16 with a wire harness 30b. Thus, since the first relay device 24 provided on a side in the rear portion of the battery device 2 for a vehicle is connected to the charging port 18, the charger 20 and the power feeder 22 disposed behind the battery device 2 for a vehicle, the wire harness 30a for connecting these devices can be shortened, and transmission loss of electric power can be reduced. In the present specification, the "relay device" includes a jumper wire, a junction box or the like that switches connection and disconnection by attaching or removing a fuse or the like.

Next, a schematic configuration of the battery device 2 for a vehicle of the embodiment of the present disclosure will be described with reference to FIGS. 2 to 4. As shown in FIG. 2, the battery device 2 for a vehicle according to the embodiment of the present disclosure has a battery body 32 in the shape of a roughly rectangular plate as a whole. The battery body 32 is arranged such that the left side in FIG. 2 faces forward of the vehicle 1, and the right side faces backward of the vehicle 1. In roughly one fourth of the region on the rear side of an upper surface of the battery body 32, a table-like portion 32a raised in height is formed, the rear seat 6 (not shown) of the vehicle 1 is disposed above the table-like portion 32a. The battery body 32 is covered with a battery case 34, and the battery case 34 is constituted by a lower tray 34a disposed on the lower side and an upper cover 34b disposed on the upper side.

Furthermore, on the upper surface of the battery body 32, a service plug 36 that is a high-voltage circuit breaker is provided adjacent to a front side of the table-like portion 32a. In order to shut off an electric circuit in the battery body 32, the service plug 36 is provided to protrude upward at the center in the vehicle width direction of the upper surface of the battery body 32. Therefore, as shown in FIG. 3, the service plug 36 is disposed to protrude into the tunnel portion 8 provided at the center in the lower portion of the vehicle 1. In the present embodiment, according to such a layout, the service plug 36 is positioned in front of the rear seat 6 (not shown) of the vehicle 1. Hence, by opening a floor member in this portion of a passenger compartment, it is possible to easily access the service plug 36 from the passenger compartment. The left side in FIG. 3 corresponds to the front side of the vehicle 1, and the right side corresponds to the rear side of the vehicle 1.

On the upper surface of the battery body 32, a protruding portion 38 is formed in a front end portion of the battery body 32 at the center in the vehicle width direction. The protruding portion 38 is formed by raising upward a central portion in the vehicle width direction of the upper cover 34b that forms the upper surface of the battery body 32. Thus, as shown in FIGS. 3 and 4, the protruding portion 38 is disposed on the front side of the vehicle 1 relative to the service plug 36 so as to close the cross section of the tunnel portion 8 in the vehicle width direction. That is, as shown in FIG. 4, the tunnel portion 8 is formed by raising a floor surface of the vehicle 1 upward, and the protruding portion 38 of the battery body 32 protrudes from the lower side into the tunnel portion 8 formed in this manner Consequently, the cross section in the vehicle width direction of the tunnel portion 8 is closed with the protruding portion 38 on the front side of the vehicle relative to the service plug 36, thereby preventing entry of a foreign object into the tunnel portion 8.

In the present embodiment, as shown in FIG. 4, the protruding portion 38 closes most of the cross section in the vehicle width direction of the tunnel portion 8, but the effect of preventing the entry of a foreign object can be obtained as long as the protruding portion 38 protrudes into the tunnel portion 8 and closes at least a part of the cross section in the vehicle width direction of the tunnel portion 8. Preferably, the protruding portion 38 is configured to close a half or more of the cross section in the vehicle width direction of the tunnel portion 8.

As shown in FIGS. 3 and 4, a connector portion 40 is provided on an end surface of the protruding portion 38 on the front side of the vehicle, and the battery device 2 for a vehicle is electrically connected through the connector portion 40 to the drive motor 12 or the like that is an electric device mounted on the vehicle 1. Specifically, the wire harness 30b is connected to the connector portion 40, electrical energy accumulated in the battery device 2 for a vehicle is supplied from the connector portion 40 to the inverter 14, etc. through the wire harness 30b, and the drive motor 12 is driven.

Further, the second relay device 26 is incorporated in the battery case 34 below the connector portion 40 provided in the protruding portion 38. In the present embodiment, the second relay device 26 is disposed in a front end portion of the battery case 34 in a front-rear direction of the vehicle 1, and switches an electrical connection between the battery device 2 for a vehicle and the drive motor 12, etc. Thus, by providing the second relay device 26 to be connected to the drive motor 12, etc. separately from the first relay device 24 to be connected to the charger 20, etc., it is possible to miniaturize individual relay devices, and it is possible to accommodate the relay devices by utilizing small empty spaces in the battery case 34.

Next, an internal structure of the battery device for a vehicle will be described with reference to FIGS. 5 to 7.

Figure 5:
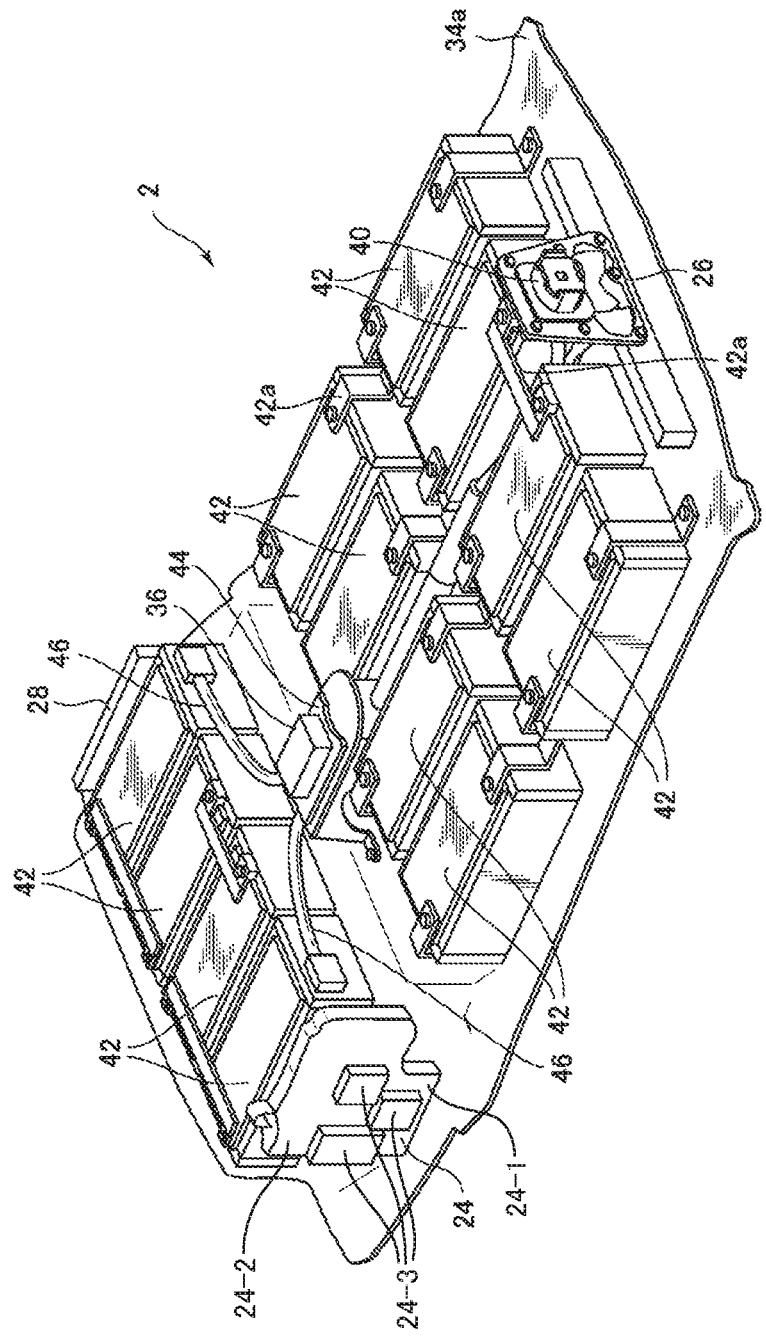
FIG. 5 is a perspective view of the battery device for a vehicle according to the embodiment of the present disclosure in a state in which an upper cover has been removed.

FIG. 5 is a perspective view showing the battery device for a vehicle in a state in which the upper cover has been removed. FIG. 6 is a top view showing the battery device for a vehicle in a state in which the upper cover has been removed. FIG. 7 is a view showing a support structure of the service plug.

As shown in FIG. 5, a plurality of battery modules 42 are arranged and accommodated in the battery case 34, and some of the battery modules 42 are stacked in two levels. In the present embodiment, each battery module 42 has a roughly rectangular parallelepiped shape, and is arranged such that the long sides are oriented in the front-rear direction of the vehicle 1. On the lower level of the array of the battery modules 42, a total of twelve battery modules 42, four in the vehicle width direction and three in the front-rear direction of the vehicle 1, are arranged. On the battery modules 42 in one row on the rear side of the vehicle 1 among the battery modules 42 disposed on the lower level, the battery modules 42 on the upper level are disposed, respectively. That is, four battery modules 42 are disposed in the vehicle width direction on the upper level. The table-like portion 32a (FIG. 2) is formed to cover the battery modules 42 disposed on the upper level, and the height of this portion is higher.

Thus, in the present embodiment, a total of 16 battery modules 42 are disposed in the battery case 34. These battery modules 42 are electrically connected in series with bus bars 42a. The service plug 36 is disposed at the center in the vehicle width direction and adjacent to the front side of the four battery modules 42 disposed on the upper level. By pulling out the service plug 36, the connection between the battery modules 42 connected in series is disconnected at one point, and a high voltage does not act on the connector portion 40.

Figure 6:
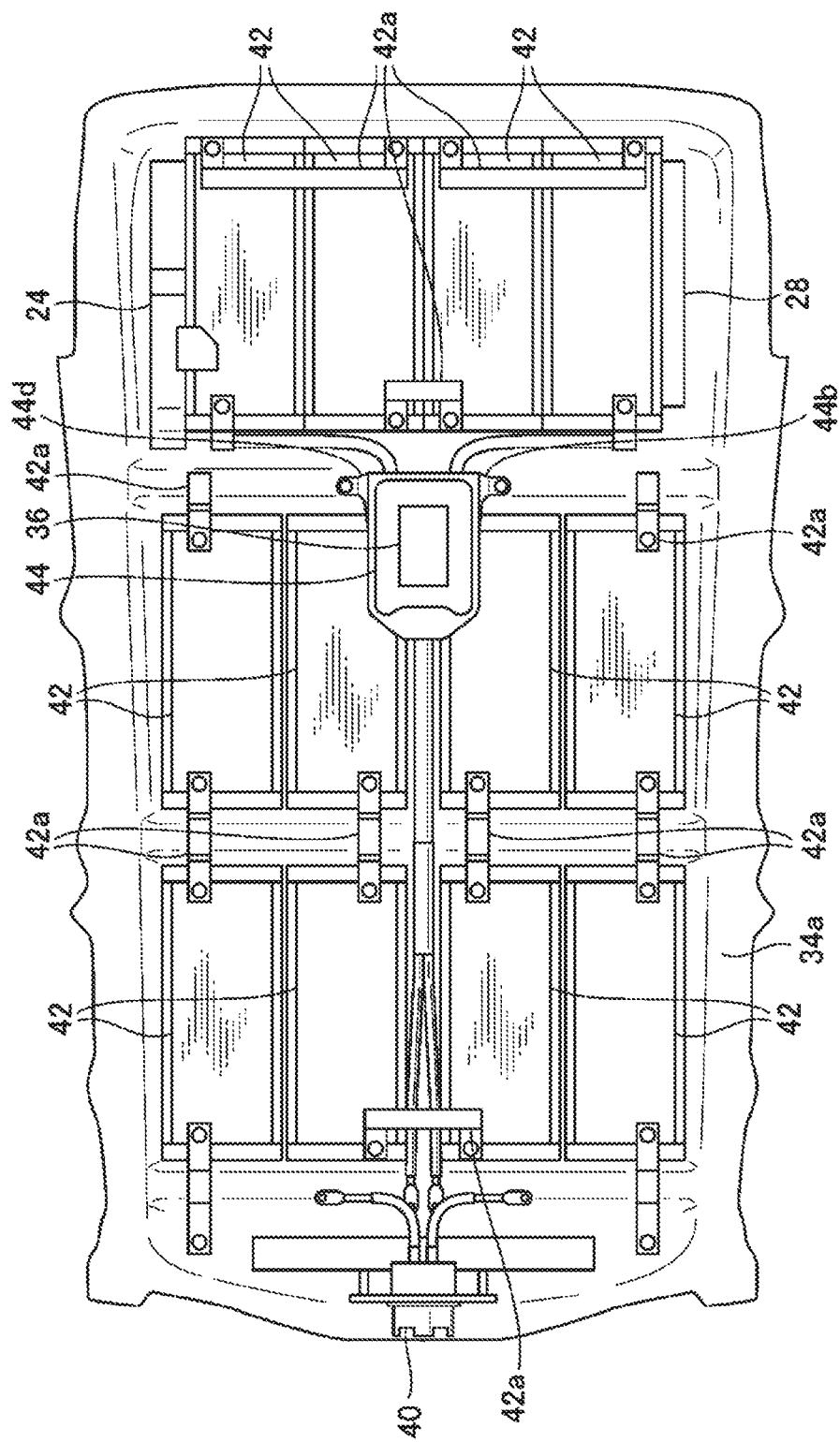
FIG. 6 is a top view of the battery device for a vehicle according to the embodiment of the present disclosure in a state in which the upper cover has been removed.

As shown in FIG. 6, the service plug 36 is disposed above some of the battery modules 42, and is disposed at a position overlapping some of the battery modules 42 in an up-down direction. As shown in FIG. 6, in the present embodiment, the service plug 36 overlaps, in the up-down direction, a part of two battery modules 42 positioned at the center in the vehicle width direction of the row in the middle in the front-rear direction of the vehicle 1.

Figure 7:
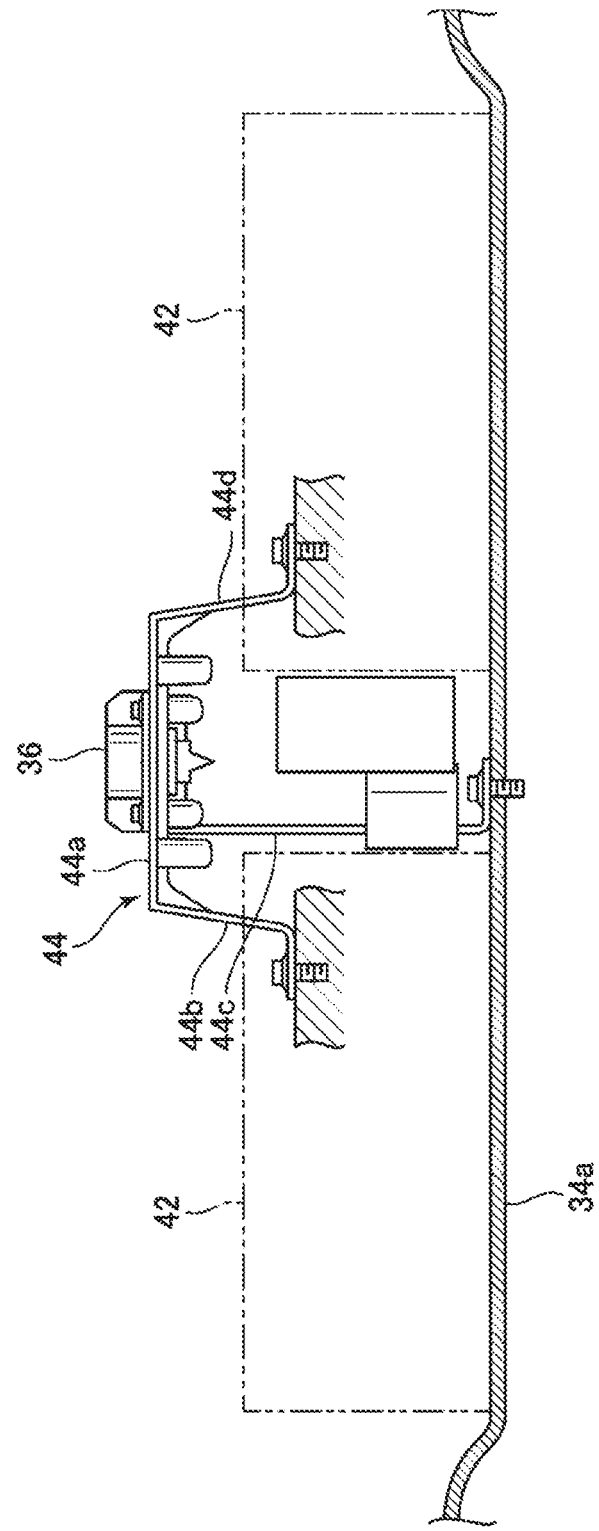
FIG. 7 is a view showing a support structure of a service plug in the battery device for a vehicle according to the embodiment of the present disclosure.

Next, as shown in FIG. 7, the service plug 36 is supported by a support member 44 with respect to the lower tray 34a of the battery case 34. That is, the support member 44 includes a flat plate portion 44a formed in a flat plate shape, and three leg portions 44b, 44c, 44d extending downward from the flat plate portion 44a. The service plug 36 is attached to the flat plate portion 44a and supported above the battery modules 42. Of the three legs, two legs 44b and 44d on the rear side of the vehicle 1 are supported above the lower tray 34a behind the battery modules 42. One leg portion 44c on the front side of the vehicle 1 is attached to the lower tray 34a of the battery case 34, extends upward between the two battery modules 42, and supports the service plug 36 through the flat plate portion 44a above the battery modules 42. Thus, in the present embodiment, since the service plug 36 is supported on the lower tray 34a through the support member 44, it is possible to dispose the battery modules 42 on the lower tray 34a in a state in which the upper cover 34b has been removed, and it is possible to attach the service plug 36, thereby improving assembling performance.

Moreover, as shown in FIG. 5, the first relay device 24 is disposed on a side in the vehicle width direction of the portion where the battery modules 42 are stacked in two levels. As indicated, the first relay device 24 includes a mounting structure 24-1 having a mounting surface 24-2 that extends in the up-down direction of the vehicle, and a plurality of relay components 24-3 mounted to the mounting surface. That is, in a side view of the vehicle 1, the first relay device 24 is disposed to overlap with the battery modules 42 stacked in two levels. The battery modules 42 incorporated in the battery device 2 for a vehicle are connected to the charging port 18, the charger 20 and the power feeder 22 (FIG. 1) as the charging device through the first relay device 24 and the wire harness 30a. The first relay device 24 is configured to switch connection and disconnection between the battery modules 42 and the charging port 18, the charger 20 and/or the power feeder 22 disposed behind the battery device 2 for a vehicle to charge the battery modules 42.

Further, as shown in FIG. 5, the battery controller 28 is disposed on the opposite side to the first relay device 24, of the portion where the battery modules 42 are stacked in two levels. That is, the battery controller 28 is disposed on the opposite side to the first relay device 24 with respect to the battery modules 42 in the vehicle width direction. The battery controller 28 is configured to control the first relay device 24 by sending a control signal to the first relay device 24. Thus, the first relay device 24 and the battery controller 28 are disposed, on both sides of the portion where the battery modules 42 are stacked in a plurality of levels, so as to overlap with the battery modules 42 in a side view of the vehicle 1. Hence, the first relay device 24 and the battery controller 28 can be compactly accommodated in the battery case 34, and the projected area of the battery device 2 for a vehicle in a side view can be reduced.

Next, as shown in FIG. 3, in the portion where the battery modules 42 are stacked in two levels, the battery modules 42 on the upper level are arranged so as to be slightly shifted toward the rear side of the vehicle 1 relative to the battery modules 42 disposed on the lower level. In a space produced by shifting the battery modules 42 on the upper level toward the rear side in such a manner (the space in front of the battery modules 42 on the upper level), a wire harness 46 is disposed to extend in the vehicle width direction. The wire harness 46 is provided for connecting the battery modules 42 to each other in the battery case 34. Thus, by shifting the battery modules 42 on the upper level toward the rear side and disposing the wire harness 46 in the space produced by the shifting toward the rear side, it is possible to reduce the risk of damage to the wire harness 46 caused by being caught between the battery modules 42 in the event of a collision of the vehicle 1 or the like.

According to the battery device 2 for a vehicle of the embodiment of the present disclosure, since the first relay device 24 is disposed on a side in the vehicle width direction of the portion where the battery modules 42 are stacked in a plurality of levels (FIG. 5), it is possible to miniaturize the battery device 2 for a vehicle while including the relay device.

Moreover, according to the battery device 2 for a vehicle of the present embodiment, the second relay device 26 is provided separately from the first relay device 24, and the second relay device 26 is disposed in the front end portion of the battery case 34 in the front-rear direction of the vehicle (FIG. 5). Hence, it is possible to miniaturize individual relay devices, and it is possible to effectively utilize small empty space in the battery case 34.

Further, according to the battery device 2 for a vehicle of the present embodiment, since connection and disconnection between the battery modules 42 and the charging port 18, the charger 20 and the power feeder 22 as the charging device disposed behind the battery device 2 for a vehicle are switched by the first relay device 24, the wire harness 30a that connects the battery modules 42 and the charging device can be shortened, and transmission loss of electric power can be reduced.

According to the battery device 2 for a vehicle of the present embodiment, since the battery controller 28 is disposed on the opposite side of the first relay device 24 with respect to the battery modules 42 in the vehicle width direction (FIG. 6), the battery controller 28 can also be compactly accommodated in the battery case 34.

Furthermore, according to the battery device 2 for a vehicle of the present embodiment, in a side view of the vehicle 1, the first relay device 24 is disposed to overlap with the battery modules 42 stacked in a plurality of levels (FIG. 5), and therefore it is possible to reduce the projected area of the battery device 2 for a vehicle in the side view.

According to the battery device 2 for a vehicle of the present embodiment, since the wire harness 46 is disposed in the space produced by shifting the battery modules 42 on the upper level toward the rear side (FIG. 3), even if the vehicle 1 collides, the wire harness 46 is less likely damaged, and the wire harness 46 can be protected.

The embodiment of the present disclosure was described above, but it is possible to add various changes to the above-described embodiment. For example, in the above-described embodiment, the service plug 36 is disposed above the battery modules 42, at a position where the service plug 36 overlaps the battery modules 42 in the up-down direction, but it is possible to dispose the service plug 36 under the battery modules 42.

In the above-described embodiment, the front of the tunnel portion 8 is closed by only the protruding portion 38, but, as a modification, another configuration can be added to the protruding portion so as to close the cross section in the vehicle width direction of the tunnel portion 8.

Figure 8:
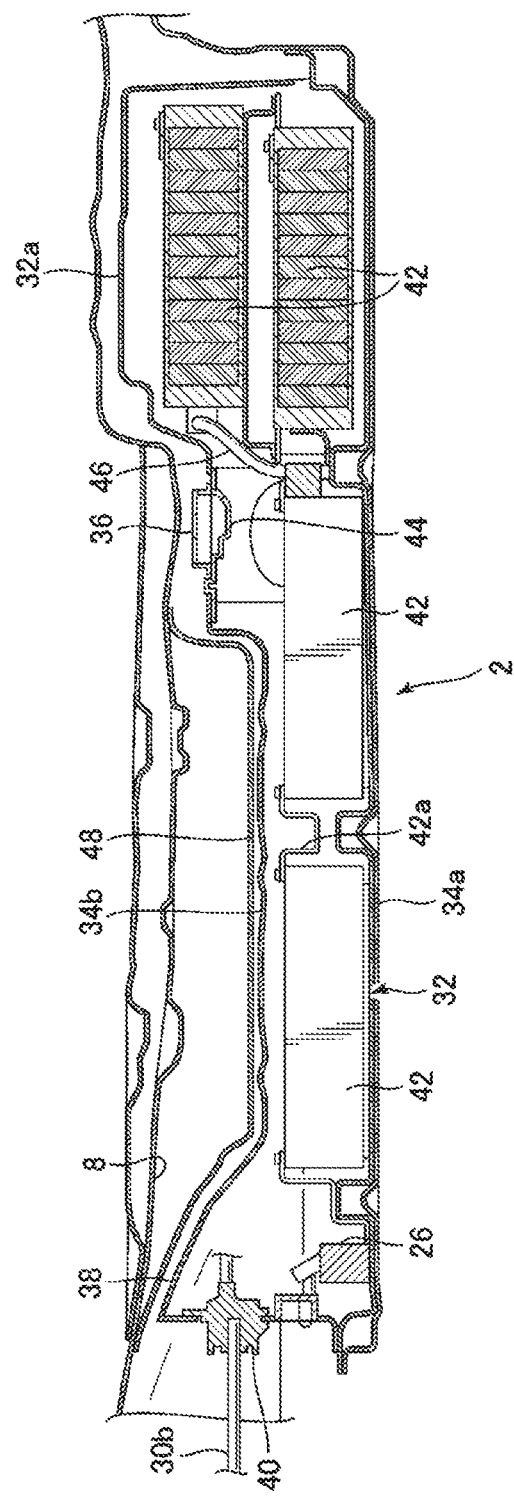
FIG. 8 is a sectional view of a vehicle incorporating a battery device for a vehicle according to a modification of the embodiment of the present disclosure.

FIG. 8 is a sectional view of the vehicle on which a battery device for a vehicle according to a modification of the embodiment of the present disclosure is mounted. As shown in FIG. 8, in this modification, a hanging portion 48 is formed in the tunnel portion 8, and the cross section in the vehicle width direction of the tunnel portion 8 is closed by the protruding portion 38 and the hanging portion 48. That is, the tunnel portion 8 is formed by a thin plate curved in an inverted U shape, and the protruding portion 38 of the battery device for a vehicle is disposed to protrude into the tunnel portion 8 from the lower side. The hanging portion 48 is formed by a thin plate attached to an upper portion inside the tunnel portion 8, and hangs and extends downward from the vicinity of a top portion in the tunnel portion 8. The hanging portion 48 is provided at a position behind the protruding portion 38 and in front of the service plug 36 in the front-rear direction of the vehicle 1.

Hence, the cross section in the vehicle width direction of the tunnel portion 8 is closed by the hanging portion 48 hanging downward from the vicinity of the top portion in the tunnel portion 8 as well as by the protruding portion 38 disposed to protrude upward from the lower end of the tunnel portion 8. Thus, since the hanging portion 48 is provided in the tunnel portion 8, even when a foreign object enters from a gap between an inner wall surface of the tunnel portion 8 and the protruding portion 38, it is possible to stop the foreign object by the hanging portion 48 and more reliably protect the service plug 36.

What is claimed is:

1. A battery device for a vehicle, the battery device being mounted in a lower portion of a vehicle and comprising:
    a battery case;
    a plurality of battery modules accommodated in the battery case and arranged such that at least some of the battery modules are stacked in a plurality of levels as stacked battery modules in a vehicle up-down direction; and
    a first relay that switches connection and disconnection between an external electric device and the battery modules, the first relay being disposed on a side in a vehicle width direction of the stacked battery modules, wherein
    the relay includes a mounting structure having a mounting surface that extends along the vehicle up-down direction, and a plurality of relay components mounted on the mounting surface.

2. The battery device for a vehicle according to claim 1, further comprising:
    a second relay that connects the battery modules and an electric motor mounted on the vehicle, the second relay being disposed in a front end portion of the battery case in a front-rear direction of the vehicle.

3. The battery device for a vehicle according to claim 1, wherein
the vehicle includes a charger configured to charge the battery modules, the charger being disposed on a rear side of the vehicle relative to the battery device, and
the first relay switches connection and disconnection between the charger and the battery modules.

4. The battery device for a vehicle according to claim 1, further comprising:
a battery controller configured to control the first relay, the battery controller being disposed on an opposite side to the first relay with respect to the stacked battery modules in the vehicle width direction.

5. The battery device for a vehicle according to claim 4, wherein
in a side view of the vehicle, the first relay is disposed to overlap with the stacked battery modules.

6. The battery device for a vehicle according to claim 1, wherein
the battery modules disposed at an upper level of the stacked battery modules are shifted toward a rear side of the vehicle in the vehicle front-rear direction relative to the battery modules disposed at a lower level of the stacked battery modules, and
a wire harness connected to the first relay is disposed in a space provided by shifting the battery modules at the upper level toward the rear side of the vehicle.

7. A battery device for a vehicle, the battery device being mounted in a lower portion of a vehicle and comprising:
a battery case;
a plurality of battery modules accommodated in the battery case and arranged such that at least some of the battery modules are stacked in a plurality of levels as stacked battery modules in a vehicle up-down direction;
a first relay that switches connection and disconnection between an external electric device and the battery modules, the first relay being disposed on a side in a vehicle width direction of the stacked battery modules; and
a second relay that connects the battery modules and an electric motor mounted on the vehicle, the second relay being disposed in a front end portion of the battery case in a front-rear direction of the vehicle, wherein
in a side view of the vehicle, the first relay is disposed to overlap with the stacked battery modules.

8. A battery device for a vehicle, the battery device being mounted in a lower portion of a vehicle and comprising:
a battery case;
a plurality of battery modules accommodated in the battery case and arranged such that at least some of the battery modules are stacked in a plurality of levels as stacked battery modules in a vehicle up-down direction; and
a first relay that switches connection and disconnection between an external electric device and the battery modules, the first relay being disposed on a side in a vehicle width direction of the stacked battery modules, wherein
the vehicle includes a charger configured to charge the battery modules, the charger being disposed on a rear side of the vehicle relative to the battery device,
the first relay switches connection and disconnection between the charger and the battery modules, and
in a side view of the vehicle, the first relay is disposed to overlap with the stacked battery modules.

9. A battery device for a vehicle, the battery device being mounted in a lower portion of a vehicle and comprising:
a battery case;
a plurality of battery modules accommodated in the battery case and arranged such that at least some of the battery modules are stacked in a plurality of levels as stacked battery modules in a vehicle up-down direction;
a first relay that switches connection and disconnection between an external electric device and the battery modules, the first relay being disposed on a side in a vehicle width direction of the stacked battery modules; and
a second relay that connects the battery modules and an electric motor mounted on the vehicle, the second relay being disposed in a front end portion of the battery case in a front-rear direction of the vehicle, wherein
the vehicle includes a charger configured to charge the battery modules, the charger being disposed on a rear side of the vehicle relative to the battery device, and
the first relay switches connection and disconnection between the charger and the battery modules.

10. The battery device for a vehicle according to claim 7, wherein
the vehicle includes a charger configured to charge the battery modules, the charger being disposed on a rear side of the vehicle relative to the battery device, and
the first relay switches connection and disconnection between the charger and the battery modules.

11. The battery device for a vehicle according to claim 7, further comprising:
a battery controller configured to control the first relay, the battery controller being disposed on an opposite side to the first relay with respect to the stacked battery modules in the vehicle width direction.

12. The battery device for a vehicle according to claim 7, wherein
the battery modules disposed at an upper level of the stacked battery modules are shifted toward a rear side of the vehicle in the vehicle front-rear direction relative to the battery modules disposed at a lower level of the stacked battery modules, and
a wire harness connected to the first relay is disposed in a space provided by shifting the battery modules at the upper level toward the rear side of the vehicle.

13. The battery device for a vehicle according to claim 8, further comprising:
a battery controller configured to control the first relay, the battery controller being disposed on an opposite side to the first relay with respect to the stacked battery modules in the vehicle width direction.

14. The battery device for a vehicle according to claim 8, wherein
the battery modules disposed at an upper level of the stacked battery modules are shifted toward a rear side of the vehicle in the vehicle front-rear direction relative to the battery modules disposed at a lower level of the stacked battery modules, and
a wire harness connected to the first relay is disposed in a space provided by shifting the battery modules at the upper level toward the rear side of the vehicle.

15. The battery device for a vehicle according to claim 9, further comprising:
a battery controller configured to control the first relay, the battery controller being disposed on an opposite side to the first relay with respect to the stacked battery modules in the vehicle width direction.

16. The battery device for a vehicle according to claim 9, wherein
- the battery modules disposed at an upper level of the stacked battery modules are shifted toward a rear side of the vehicle in the vehicle front-rear direction relative to the battery modules disposed at a lower level of the stacked battery modules, and
- a wire harness connected to the first relay is disposed in a space provided by shifting the battery modules at the upper level toward the rear side of the vehicle.

* * * * *